US009128723B2

(12) United States Patent
Sasikumar et al.

(10) Patent No.: US 9,128,723 B2
(45) Date of Patent: Sep. 8, 2015

(54) METHOD AND APPARATUS FOR DYNAMIC DOCUMENT OBJECT MODEL (DOM) AWARE CODE EDITING

(71) Applicant: Adobe Systems Incorporated, San Jose, CA (US)

(72) Inventors: Anirudh Sasikumar, Foster City, CA (US); Sujit Reddy Gurrala, Bangalore (IN)

(73) Assignee: ADOBE SYSTEMS INCORPORATED, San Jose, CA (US)

( * ) Notice: Subject to any disclaimer, the term of this patent is extended or adjusted under 35 U.S.C. 154(b) by 159 days.

(21) Appl. No.: 13/903,208

(22) Filed: May 28, 2013

(65) Prior Publication Data

US 2014/0359571 A1  Dec. 4, 2014

(51) Int. Cl.
*G06F 9/44* (2006.01)

(52) U.S. Cl.
CPC .................................. *G06F 8/35* (2013.01)

(58) Field of Classification Search
None
See application file for complete search history.

(56) References Cited

U.S. PATENT DOCUMENTS

| 8,387,006 | B1* | 2/2013 | Taylor | 717/110 |
| 2007/0055964 | A1* | 3/2007 | Mirkazemi et al. | 717/140 |
| 2009/0327858 | A1* | 12/2009 | Tsun et al. | 715/234 |
| 2010/0269095 | A1* | 10/2010 | King et al. | 717/111 |
| 2014/0047413 | A1* | 2/2014 | Shelve et al. | 717/110 |

OTHER PUBLICATIONS

Jensen et al., "Modeling the HTML DOM and Browser API in Static Analysis of JavaScript Web Applications," ACM, 2011.*

* cited by examiner

*Primary Examiner* — Insun Kang
(74) *Attorney, Agent, or Firm* — Keller Jolley Preece

(57) ABSTRACT

A computer implemented method and apparatus for dynamic Document Object Model (DOM) aware code editing. The method comprising storing, in a DOM model, a plurality of Document Object Model (DOM) elements in one or more HyperText Markup Language (HTML) files for a project; and storing, in the DOM model at least one modification to the DOM that results from execution of one or more JavaScript code files for the project, wherein during JavaScript code editing, the at least one modification to the DOM identifies an interaction between the JavaScript code and the DOM elements.

20 Claims, 4 Drawing Sheets

FIG. 5

METHOD AND APPARATUS FOR DYNAMIC DOCUMENT OBJECT MODEL (DOM) AWARE CODE EDITING

BACKGROUND OF THE INVENTION

1. Field of the Invention

Embodiments of the present invention generally relate to software development and, more particularly, to a method and apparatus for dynamic Document Object Model (DOM) aware code editing.

2. Description of the Related Art

HyperText Markup Language (HTML) is used by web developers to create web pages. Tags in HTML pages create objects, such as images, forms, buttons, and the like. When the HTML code runs, these objects are represented in a Document Object Model (DOM) of the page as a tree structure. JavaScript is used to manipulate the HTML objects in the DOM in order to create, for example, dynamic user interfaces on the web. JavaScript code is embedded in an HTML file between <SCRIPT> and </SCRIPT> tags. Below a line in which the developer embeds the JavaScript code, the developer can reference, or call, that JavaScript code in response to an event handler or an HTML link. Between the <SCRIPT> and </SCRIPT> tags, a developer may include JavaScript code directly into the HTML or the developer may use a separate, external JavaScript file (a file containing only JavaScript statements and bearing a .js extension) in the HTML file. Hence, JavaScript code that transforms the DOM has an indirect relationship with the DOM, in that its effect on the DOM is not made clear until the JavaScript code executes on the DOM.

Because of the dynamic interrelationship between the DOM and the JavaScript code, developer authoring tools, such as integrated development environments (IDEs), cannot accurately assist developers in providing code completion, code refactoring or other productivity features, since code authoring is a process done prior to code execution, before the code has a dynamic effect on the DOM. That is, currently, code completion prior to code execution is based solely on the static HTML DOM. The static HTML DOM represents the created HTML objects without the execution of the JavaScript code that makes it dynamic. For example, when a developer types a tag, such as <p>, a current auto-complete feature may automatically input </p> because the end tag </p> is required at some point after the start tag <p>, in accordance with the static DOM. However, code completion hints such as variable or attribute completion during code development is not possible. Hence, code completion is poor and incomplete at best.

Therefore, there is a need for a method and apparatus for dynamic DOM aware code editing.

SUMMARY OF THE INVENTION

A method and apparatus for dynamic Document Object Model (DOM) aware code editing substantially as shown in and/or described in connection with at least one of the figures, as set forth more completely in the claims.

These and other features and advantages of the present disclosure may be appreciated from a review of the following detailed description of the present disclosure, along with the accompanying figures in which like reference numerals refer to like parts throughout.

BRIEF DESCRIPTION OF THE DRAWINGS

FIG. 5 depicts a screen shot of using the DOM model of FIG. 1 during code development, according to one or more embodiments.

Figure 1:
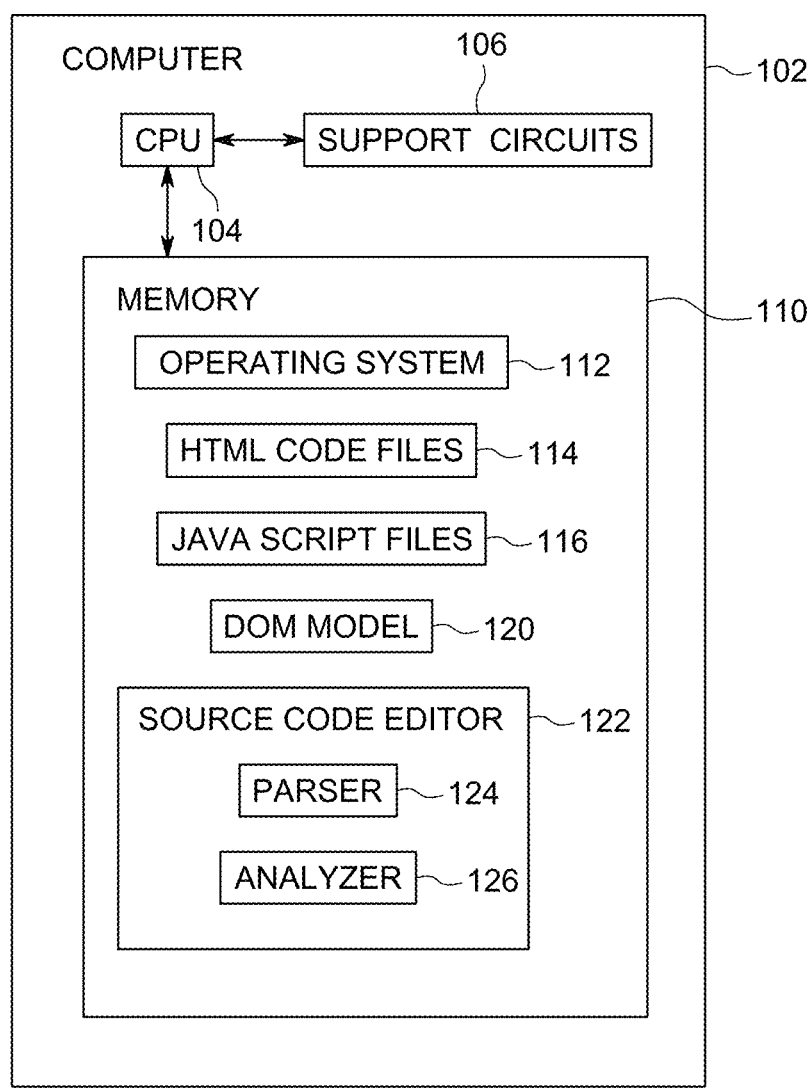
FIG. 1 is a block diagram of an apparatus for dynamic Document Object Model (DOM) aware code editing, according to one or more embodiments.

While the method and apparatus is described herein by way of example for several embodiments and illustrative drawings, those skilled in the art will recognize that the method and apparatus for dynamic Document Object Model (DOM) aware code editing is not limited to the embodiments or drawings described. It should be understood, that the drawings and detailed description thereto are not intended to limit embodiments to the particular form disclosed. Rather, the intention is to cover all modifications, equivalents and alternatives falling within the spirit and scope of the method and apparatus for dynamic Document Object Model (DOM) aware code editing defined by the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Embodiments of the present invention include a method and apparatus for dynamic Document Object Model (DOM) aware code editing. The embodiments create a DOM model to hold data about changes to the objects in the HTML code. The DOM model records changes in a list data structure. Each node in the list holds data about changes to HTML, for example, when an attribute is added, removed, or modified or when a tag is added, removed, or modified. The data recorded is the type of change and the actual attribute/tag key value pair.

The embodiments parse the HTML files for a project and analyze each line, one at a time. The embodiments then parse the JavaScript files for the project and analyze each line one at a time. The embodiments store information from the JavaScript files. If an HTML element is added or modified, the method records the added/modified attribute, the element, the change to the attribute, and the line number where the addition/modification took place. If a function is invoked, the method records the changes to the DOM that are made from the invoked function and records them as changes made in the line where the function was invoked. If an HTML element is added or removed, the method records the addition/deletion and the line number where the addition/deletion occurred. Finally, the method stores the information in a DOM model. The DOM model includes a list of static DOM elements in an HTML file, elements that have been added and removed at various locations, and modifications made to DOM elements at various locations.

Advantageously, the present invention may be a plug-in in any integrated development environment (IDE) targeting web application developers using HTML and JavaScript as their platform, such as ADOBE® DREAMWEAVER®, ADOBE® Edge Code, ADOBE® COLDFUSION®

BUILDER™, and the like. With the creation of a DOM model in accordance with embodiments of the invention, features may be added to the IDE to increase developer productivity, including, but not limited to, code hinting with static and dynamic DOM elements, displaying a state of an HTML DOM at a location, displaying a list of changes made to an HTML DOM at a location, live error highlighting, and/or code factoring.

Various embodiments of a method and apparatus for dynamic Document Object Model (DOM) aware code editing are described. In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description that follow are presented in terms of algorithms or symbolic representations of operations on binary digital signals stored within a memory of a specific apparatus or special purpose computing device or platform. In the context of this particular specification, the term specific apparatus or the like includes a general-purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

FIG. 1 is a block diagram of an apparatus 100 for dynamic Document Object Model (DOM) aware code editing, according to one or more embodiments. The apparatus 100 includes a computer 102. The computer 102 includes a Central Processing Unit (CPU) 104, support circuits 106, and a memory 110. The CPU 104 may include one or more commercially available microprocessors or microcontrollers that facilitate data processing and storage. The various support circuits 106 facilitate the operation of the CPU 104 and include one or more clock circuits, power supplies, cache, input/output circuits, and the like. The memory 110 includes at least one of Read Only Memory (ROM), Random Access Memory (RAM), disk drive storage, optical storage, removable storage and/or the like.

The memory 110 includes an operating system 112, one or more HTML code files 114, one or more JavaScript files 116, a DOM model 120, and a source code editor 122. The operating system 112 may include various commercially known operating systems. The source code editor 122 is a text editor program designed specifically to allow programmers to edit source code of computer programs and includes a parser 124 and an analyzer 126.

When a source code editor 122 is opened, the parser 124 parses the HTML files 114 for a project and the analyzer 126 analyze each line of each HTML file 114, one at a time. The parser 124 then parses the JavaScript files 116 for the project and the analyzer 126 analyzes each line of each JavaScript file 116, one at a time. The source code editor 122 stores information that the analyzer 126 has extracted from the JavaScript files 116. If an HTML element is added or modified, the source code editor 122 records as information the added/modified attribute, the element, the change to the attribute, and the line number where the addition/modification took place. If a function is invoked, the source code editor 122 records as information the changes to the DOM that are made from the invoked function and records them as changes made in the line where the function was invoked. If an HTML element is added or removed, the source code editor 122 records as information the addition/deletion and the line number where the addition/deletion occurred. Finally, the source code editor 122 stores the recorded information in a DOM model 120. The DOM model 120 includes a list of static DOM elements from the HTML files 114, elements that have been added and/or removed at various locations, as well as modifications made to DOM elements at various locations.

Figure 2:
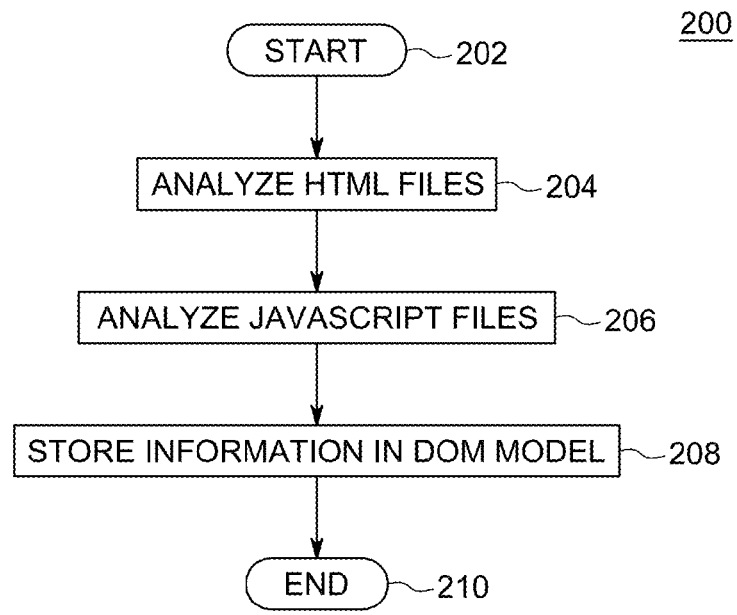
FIG. 2 is a flowchart of a method for generating the DOM model as performed by the source code editor of FIG. 1, according to one or more embodiments.

FIG. 2 is a flowchart of a method 200 for generating the DOM model 120 as performed by the source code editor 122 of FIG. 1, according to one or more embodiments. The method 200 analyzes the HTML files and the JavaScript files to create the DOM model, which may be used for assisting developers by providing code completion, code refactoring, or other productivity features.

The method 200 starts at step 202 and proceeds to step 204. At step 204, the method 200 analyzes and records all HTML files for a project, as described in further detail with respect to FIG. 3, below. The method 200 proceeds to step 206, where the method 200 analyzes and records all JavaScript files for a project, as described in further detail with respect to FIG. 4, below.

The method 200 proceeds to step 208, where the method 200 stores the information recorded during the analysis of the HTML files and JavaScript files in a DOM model. The DOM model contains a list of static DOM elements from the HTML file, all of the interactions between the HTML elements and JavaScript recorded, including when elements are created and/or removed, when attributes of elements are modified, and when and what functions access or modify the HTML elements and any other modifications made to the DOM elements at various locations. The DOM model is created during code development, before code execution, so that it may be used for assisting developers during code creation and/or editing by providing code completion (i.e., predicting a word or phrase based on what is already typed), code refactoring (i.e., renaming a variable or method in one place and having the name change reflecting in all places where the variable or method is used), or other productivity features. The method 200 proceeds to step 210 and ends.

Figure 3:
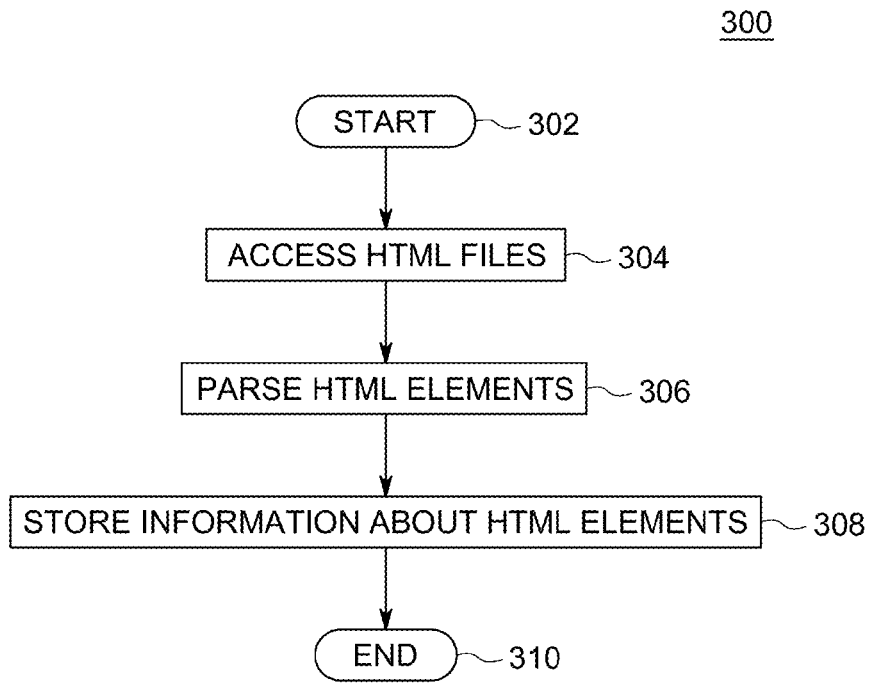
FIG. 3 is a flowchart of a method for analyzing the HTML files of a project, as performed by the source code editor of FIG. 1, according to one or more embodiments.

FIG. 3 is a flowchart of a method 300 for analyzing the HTML files of a project, as performed by the source code editor 122 of FIG. 1, according to one or more embodiments. The method 300 accesses the HTML files for a project and stores information about all of the elements including location information, such as the line number where the element is added.

The method 300 starts at step 302 and proceeds to step 304. At step 304, the method 300 accesses the HTML files for a project. The HTML files include HTML elements. HTML elements contain a start tag and an end tag. For example, a paragraph has a start tag of <p> and an end tag of </p>. A link may have a start tag of <a href="defaultlink.htm"> and an end tag of </a>. The element content is everything between the start tag and the end tag. HTML elements may have attributes. An attribute may be a class of an element, a unique id for an element, a style for an element, a title for the element, and the like. In the previous example, the link address is specified in a href attribute.

The method 300 proceeds to step 306, where the method 300 parses the HTML file one line at a time. Parsing comprises a rule-based analysis of a string of words into constituent parts. For each line of each HTML file, the method 300 reads the HTML element. For example, line 7 of an HTML file may read:

<div id="divlogin"/>

The <div> tag is used to group together HTML elements and apply the same style, for example, font, to the included elements. The method 300 parses the line of code so as to recognize that this is an HTML element that is of type div and has an id attribute of "divLogin". If, for example, an attribute value of an HTML element makes a JavaScript call, for example, onmouseover="foo(event)", the value of the attribute is stored as a string.

The method 300 proceeds to step 308, where the method 300 stores the information about the element, including the line number where the element was added. The information may be stored in a temporary file or stored in the DOM model. The information may be stored as follows:

Value: <div id='divLogin/>
    Type: dom addition
    Line: 7
    File: main.js

The method 300 parses each line of each HTML file and stores the information. When complete, the method 300 has stored all HTML elements of the project, including their attributes and when they were added, removed, or modified. When all lines of HTML code are analyzed, the method 300 proceeds to step 310 and ends.

Figure 4:
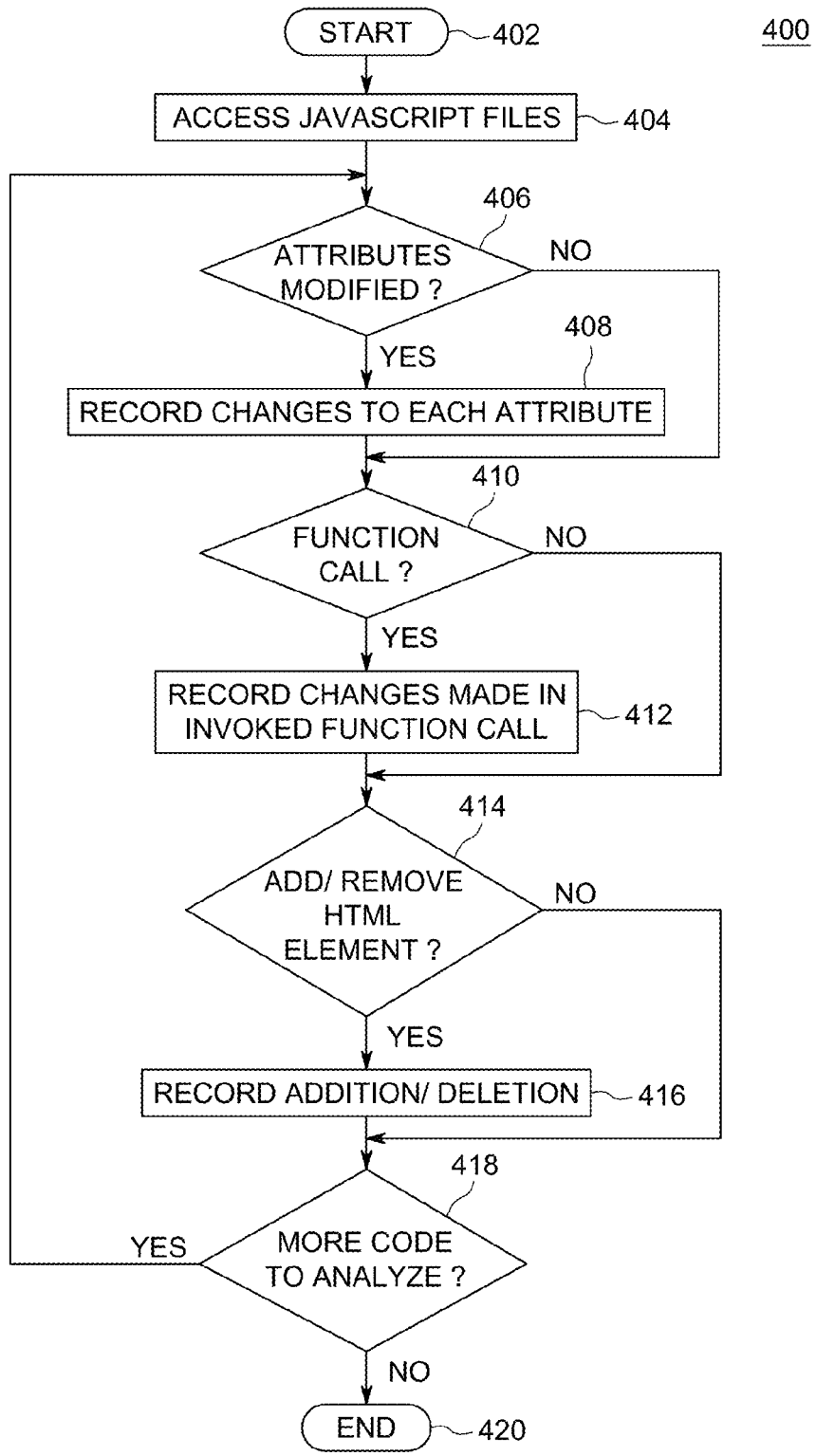
FIG. 4 is a flowchart of a method for analyzing JavaScript files of a project, as performed by the source code editor of FIG. 1, according to one or more embodiments.

FIG. 4 is a flowchart of a method 400 for analyzing JavaScript files of a project, as performed by the source code editor 122 of FIG. 1, according to one or more embodiments. The method 400 accesses the JavaScript files for a project and records information about actions taking place in the JavaScript code including location information, such as the line number where the action is performed. There are six data types in JavaScript, namely, object, number string, Boolean, null, and undefined. These data types may be manipulated using the JavaScript code in the files. The method 400 records these changes and the locations in the code where they occur.

The method 400 starts at step 402 and proceeds to step 404. At step 404, the method 400 accesses the JavaScript files for a project. The JavaScript file contains code that manipulates the HTML elements. The code may add or edit attributes of an element, make function calls that modify HTML elements, and/or add or remove HTML elements. The method 400 analyzes each line of each JavaScript file. The method 400 starts with a first line of code and proceeds to step 406.

At step 406, the method 400 parses the line of code and determines whether one or more attributes are added or modified. For example, the code may read:

1. var txtInput=document.getElementById("txtInput");
    2. txtInput.setAttribute("type", "password");

In the above example, the txtInput element has a type attribute that is set to password in line 2. If the method 400 determines that an attribute is added or modified, the method 400 proceeds to step 408, where the method 400 records the changes to the attribute. The change may be recorded as follows:

Attribute: type
    NewValue: password
    OldValue:
    Target: txtInput
    Type attribute modification
    Line 122
    File: foo.js The method 400 proceeds to step 410. However, if at step 406, the method 400 determines that an attribute has not been added or modified, the method 400 proceeds to step 410.

At step 410, the method 400 determines whether the code contains a function call. For example, line number 129 may contain:

```
function someFunction( ) {
    var newDiv = document.getElementById("newlyMinted");
    newDiv.setAttribute("class", "newlyMintedStyle");
    var txtInput = document.getElementById("txtInput");
    txtInput.setAttribute("value", "Sometext");
}
```

If the method 400 determines the line of code contains a function call, the method 400 analyzes the code inside the function. The method 400 proceeds to step 412, where the method 400 records changes to the DOM made in the invoked function and records the changes as changes made in the line number where the function call is made, in this example, line 129. Each change that is stored has a scope associated with it. The scope may be "global" or the scope may be a particular function. In the example above, the scope is "someFunction". One element describes the modification of an attribute class of element newlyMinted, whereas a second element describes the modification of an attributed value for an element with id txtInput, stored as described above.

The method 400 proceeds to step 414. However, if at step 410, the method 400 determines that a function call is not made, the method 400 proceeds to step 414.

At step 414, the method 400 determines whether HTML elements are added or removed. For example, the code may be as follows:

1. varlblPwd=document.createTextNode("Password:");
    2. var divLogin=document.getElementById("divLogin");
    3. divLogin.appendChild(lblPwd);

In the code, a new element of type TextNode is created in line number 1 and this newly created element is added as a child in line number 2 to an element whose id is divLogin. If the method 400 determines the code adds or removes an element, the method 400 proceeds to step 416, where the method 400 records the addition/deletion. The method 400 may record the addition/deletion as follows:

Type: dom addition
    Target: passwordInput
    Parent: divLogin

Position: 2
Line: 3
File: main.js

The method 400 proceeds to step 418. However, if at step 414, the method 400 determines that an element has not been added or deleted, the method 400 proceeds to step 418. At step 418, the method 400 determines whether there is more code to analyze. If the method 400 determines there is more code to analyze, the method 400 proceeds to step 406 and iterates until all of the JavaScript code has been analyzed. When all code has been analyzed, the method 400 proceeds to step 420 and ends.

Figure 5:
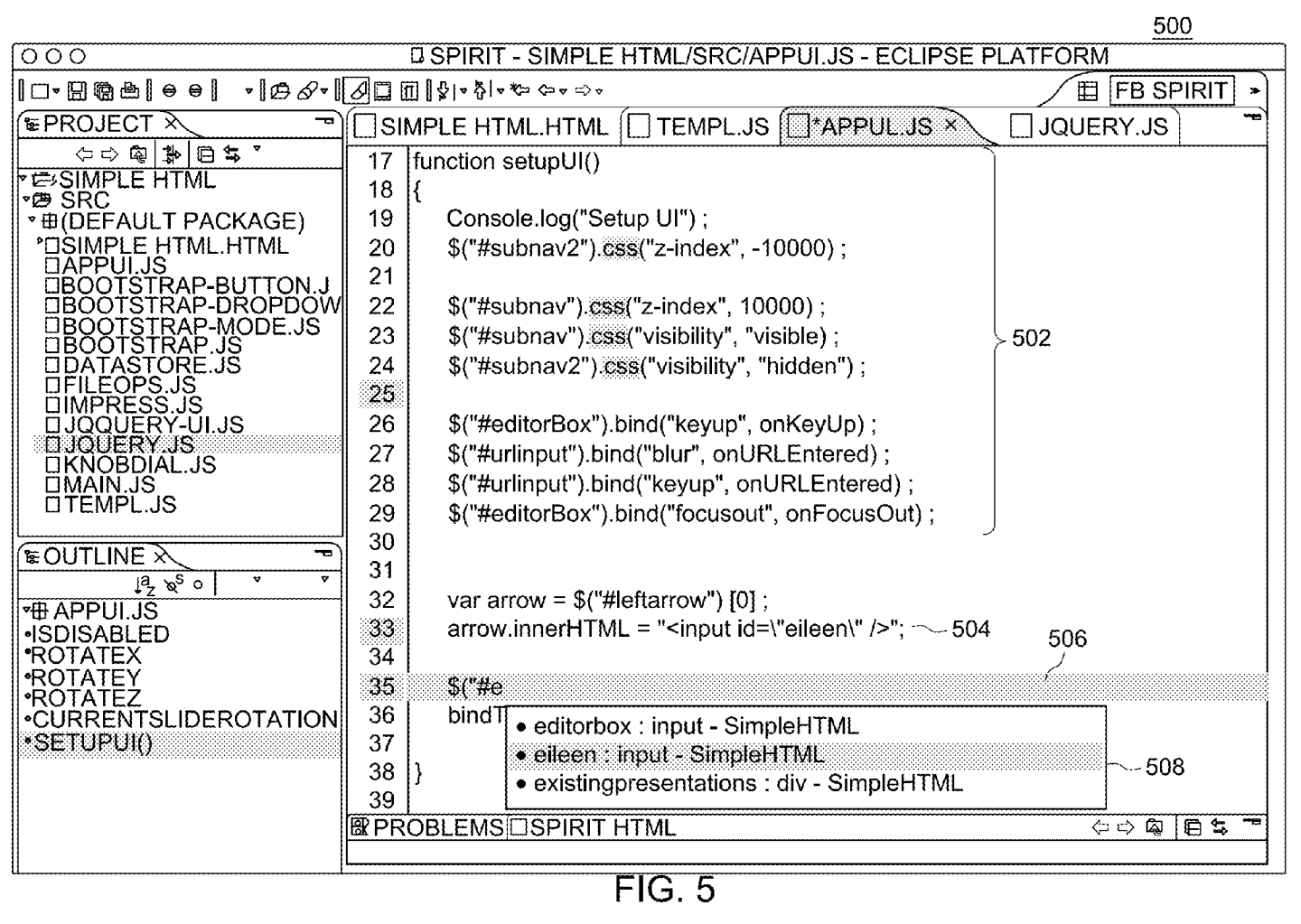

FIG. 5 depicts a screen shot 500 of using the DOM model 120 of FIG. 1 during code development, according to one or more embodiments. The screen shot 500 contains JavaScript code 502 for a project. A developer may add line 33 (504) of code assigning variable arrow an input id of "eileen". Immediately upon hitting return during the code development, this information is stored in the SOM model. On line 35 (506), the developer may type "$("#e". In the prior art, JavaScript APIs access the DOM to generate auto-complete hints 508. However, the DOM is not created until the code is executed. Using the DOM model of the present invention, even without code execution, the JavaScript APIs may access the DOM model in order to produce the auto-complete hints 508.

The embodiments of the present invention may be embodied as methods, apparatus, electronic devices, and/or computer program products. Accordingly, the embodiments of the present invention may be embodied in hardware and/or in software (including firmware, resident software, micro-code, etc.), which may be generally referred to herein as a "circuit" or "module". Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device. These computer program instructions may also be stored in a computer-usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium include the following: hard disks, optical storage devices, a transmission media such as those supporting the Internet or an intranet, magnetic storage devices, an electrical connection having one or more wires, a portable computer diskette, a random access memory (RAM), a read-only memory (ROM), an erasable programmable read-only memory (EPROM or Flash memory), an optical fiber, and a compact disc read-only memory (CD-ROM).

Computer program code for carrying out operations of the present invention may be written in an object oriented programming language, such as Java®, Smalltalk or C++, and the like. However, the computer program code for carrying out operations of the present invention may also be written in conventional procedural programming languages, such as the "C" programming language and/or any other lower level assembler languages. It will be further appreciated that the functionality of any or all of the program modules may also be implemented using discrete hardware components, one or more Application Specific Integrated Circuits (ASICs), or programmed Digital Signal Processors or microcontrollers.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present disclosure and its practical applications, to thereby enable others skilled in the art to best utilize the invention and various embodiments with various modifications as may be suited to the particular use contemplated.

The methods described herein may be implemented in software, hardware, or a combination thereof, in different embodiments. In addition, the order of methods may be changed, and various elements may be added, reordered, combined, omitted, modified, etc. All examples described herein are presented in a non-limiting manner. Various modifications and changes may be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

While the foregoing is directed to embodiments of the present invention, other and further embodiments of the invention may be devised without departing from the basic scope thereof, and the scope thereof is determined by the claims that follow.

The invention claimed is:

1. A computer implemented method for dynamic Document Object Model (DOM) aware code editing comprising:
    storing, in a DOM model, a plurality of elements in one or more HyperText Markup Language (HTML) files of a project;
    identifying, prior to code execution and in the DOM model, at least one modification to the DOM elements that results from the invocation of one or more JavaScript code files for the project,
    wherein during JavaScript code development, the at least one modification to the DOM elements is based on an interaction between the JavaScript code and the DOM elements; and
    accessing, prior to code execution, the DOM model to perform at least one of code completion or code refactoring.

2. The method of claim 1, wherein storing the plurality of DOM elements comprises identifying at least a type of a DOM element and a line number in which the DOM element is identified.

3. The method of claim 1, wherein the at least one modification to the DOM elements is at least one of an addition or modification to an attribute of a DOM element, a function call, or an addition or removal of a DOM element.

4. The method of claim 3, wherein the at least one modification to the DOM elements comprises a line number where the at least one modification is made.

5. The method of claim 4, wherein modifications made to the DOM elements within a function are stored as changes made at the line number where the function call was invoked.

6. The method of claim 1, further comprising updating the DOM model after each line of code is entered.

7. The method as recited in claim 1, wherein accessing the DOM model to perform at least one of code completion or code refactoring comprises performing at least one of code completion or code refactoring after each line of code is entered.

8. A system for dynamic Document Object Model (DOM) aware code editing comprising:
   at least one processor; and
   at least one non-transitory computer-readable storage medium storing instructions thereon that, when executed by the at least one processor, cause the system to:
   store, in a DOM model, a plurality of elements in one or more HyperText Markup Language (HTML) files of a project;
   identify, prior to code execution and in the DOM model at least one modification to the DOM elements that results from the invocation of one or more JavaScript files for the project, wherein during JavaScript code editing, the at least one modification to the DOM is based on an interaction between the JavaScript code and the DOM elements; and
   access, prior to code execution, the DOM model to perform at least one of code completion or code refactoring.

9. The system of claim 8, wherein the instructions that cause the system to store the plurality of DOM elements further cause the system to identify at least a type of a DOM element and a line number in which the DOM element is identified.

10. The system of claim 8, wherein the at least one modification to the DOM elements is at least one of an addition or modification to an attribute of a DOM element, a function call, or an addition or removal of a DOM element, and wherein the at least one modification to the DOM elements comprises a line number where the at least one modification is made.

11. The system of claim 10, wherein modifications made to the DOM elements within a function are stored as changes made at the line number where the function call was invoked.

12. The system of claim 8, further comprising instructions that cause the system to update the DOM model after each line of code is entered.

13. The system as recited in claim 8, the instructions that cause the system to access the DOM model to perform at least one of code completion or code refactoring further cause the system to perform at least one of code completion or code refactoring after each line of code is entered.

14. A non-transitory computer readable medium for storing computer instructions that, when executed by at least one processor causes the at least one processor to perform a method for dynamic Document Object Model (DOM) aware code editing comprising:
   storing, in a DOM model, a plurality of elements in one or more HyperText Markup Language (HTML) files of a project;
   identifying, prior to code execution and in the DOM model, at least one modification to the DOM elements that results from the invocation of one or more JavaScript code files for the project,
   wherein during JavaScript code editing, the at least one modification to the DOM is based on an interaction between the JavaScript code and the DOM elements; and
   accessing, prior to code execution, the DOM model to perform at least one of code completion or code refactoring.

15. The computer readable medium of claim 14, wherein storing the plurality of DOM elements comprises identifying at least a type of a DOM element and a line number in which the DOM element is identified.

16. The computer readable medium of claim 14, wherein the at least one modification to the DOM elements is at least one of an addition or modification to an attribute of a DOM element, a function call, or an addition or removal of a DOM element.

17. The computer readable medium of claim 16, wherein the at least one modification to the DOM elements comprises a line number where the at least one modification is made.

18. The computer readable medium of claim 17, wherein modifications made to the DOM elements within a function are stored as changes made at the line number where the function call was invoked.

19. The computer readable medium of claim 14, further comprising updating the DOM model after each line of code is entered.

20. The computer readable medium of claim 14, wherein accessing the DOM model to perform at least one of code completion or code refactoring comprises performing at least one of code completion or code refactoring after each line of code is entered.

* * * * *